United States Patent [19]
Patterson et al.

[11] Patent Number: 5,329,349
[45] Date of Patent: Jul. 12, 1994

[54] METHOD FOR TUNING FIBER OPTIC SENSOR COILS

[75] Inventors: Ralph A. Patterson, Moorpark; John D. Wilde, Woodland Hills, both of Calif.

[73] Assignee: Litton Systems, Inc., Beverly Hills, Calif.

[21] Appl. No.: 58,123

[22] Filed: May 10, 1993

[51] Int. Cl.$^5$ .................. G01N 21/84; G01C 19/64
[52] U.S. Cl. ................................. 356/73.1; 356/350
[58] Field of Search ................... 356/73.1, 350

[56] References Cited

U.S. PATENT DOCUMENTS

| | | | |
|---|---|---|---|
| 4,781,461 | 11/1988 | Baron et al. | 356/350 |
| 4,856,900 | 8/1989 | Ivancevic | 356/350 |
| 5,168,539 | 12/1992 | Negishi et al. | 356/350 X |

*Primary Examiner*—Vincent P. McGraw
*Attorney, Agent, or Firm*—Elliott N. Kramsky

[57] ABSTRACT

A method for tuning a sensor coil for a fiber optic gyroscope. The coil is initially wound in a known pattern. One end of the fiber of the wound coil is then adjusted relative to the other end so that a known differential is obtained that effectively displaces the midpoint of the winding pattern. The coil is then attached to an interferometer test apparatus and performance measured. After successive observations a "trimmed" coil is obtained of acceptable performance characteristics.

16 Claims, 4 Drawing Sheets

METHOD FOR TUNING FIBER OPTIC SENSOR COILS

BACKGROUND

1. Field of the Invention

The present invention relates to fiber optic gyroscopes. More particularly, this invention pertains to a method for tuning the gyro sensor coil to eliminate non-reciprocity error sensitivities.

2. Description of the Prior Art

A fiber optic gyroscope comprises the following main components: (1) a light source, (2) a beamsplitter (either a fiber optic directional coupler or an integrated-optics Y-junction), (3) a fiber optic coil, (4) a polarizer (and sometimes one or more depolarizers), and (5) a detector. Light from the light source is split by the beamsplitter into copropagating and counterpropagating waves travelling in the sensing coil. The associated electronics measures the phase relationship between the two interfering, counter-propagating beams of light that emerge from opposite ends of the coil. The difference between the phase shifts experienced by the two beams provides a measure of the rate of rotation of the platform to which the instrument is fixed.

Environmental factors can affect the measured phase shift difference between the counterpropagating beams, thereby introducing a bias or error. Such environmental factors include variables such as temperature, vibration (acoustical and mechanical) and magnetic fields. Such factors are both time-varying and unevenly distributed throughout the coil. These environmental factors induce variations in the optical light path that each counterpropagating wave encounters as it travels through the coil. The phase shifts induced upon the two waves are unequal, producing a net undesirable phase shift which is indistinguishable from the rotation-induced signal.

While appropriate coil winding techniques can minimize some of the bias errors found in the output of a fiber optic gyro, in practice it is not possible to attain a "perfect" winding pattern. Bumps, wrinkles and various errors will invariably occur in winding. To the extent that such asymmetries exist, winding patterns are rarely as intended and the reduction of output bias is inherently limited. That is, while an intended symmetric coil winding pattern may locate similarly situated fiber segments equal lengths from the fiber center, in practice the theoretical cancellation of Shupe error due to temperature change is not observed. Rather, the presence of such difficult-to-avoid winding errors as "drop outs" and the like regularly frustrate the fabrication of a perfectly symmetric sensor coil. Such winding errors are to be expected in view of the quite substantial task involved in the precise winding of a coil of, for example, one thousand meters of optical fiber. As a result of such unavoidable winding imperfections, time-dependent changes in fiber properties, bias effects, sometimes significant, appear in the outputs of even symmetrically-wound sensor coils.

SUMMARY OF THE INVENTION

The present invention addresses and overcomes the preceding and other shortcomings of the prior art by providing a method for tuning a sensor coil of the type that includes an optical fiber of known length arranged into a winding pattern. The method is begun by adjusting one end of the wound coil by a known amount with respect to the other so that the length of fiber between the center of the winding pattern and one end differs from that between the center and the other end by such amount. The coil is then attached to test apparatus arranged so that the performance of the coil in an interferometer may be ascertained. The performance of the coil is then observed. The sequence of adjusting the ends of the coil and measuring performance is then repeated until an acceptable level of bias error is observed and the adjusted coil is then removed from the test apparatus.

The preceding and other features and advantages of the invention will become further apparent from the detailed description that follows. Such description is accompanied by a set of drawing figures. Numerals of the drawing figures, corresponding to those of the written text, point to the various features of this invention with like numerals referring to like features throughout.

DETAILED DESCRIPTION

Figure 1:
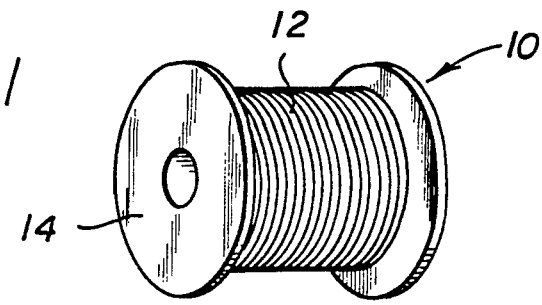
FIG. 1 is a perspective view of a sensor coil for a fiber optic gyroscope.

Turning to the drawings, FIG. 1 is a perspective view of a sensor coil 10 that provides a critical element of a fiber optic gyro system. In use, it is rigidly fixed to a platform whose rotation rate is to be measured.

The sensor coil 10 comprises an optical fiber 12 that is shown wound upon a mandrel 14 that includes a pair of end flanges. The coil 10 serves as an optical guide for receiving a counterpropagating beam pair emitted from a common light source (not shown). While the supportive mandrel 14 of FIG. 1 is of a type that terminates in opposed flanges, the presence or absence thereof does not constitute an essential element of the invention.

Figure 2:
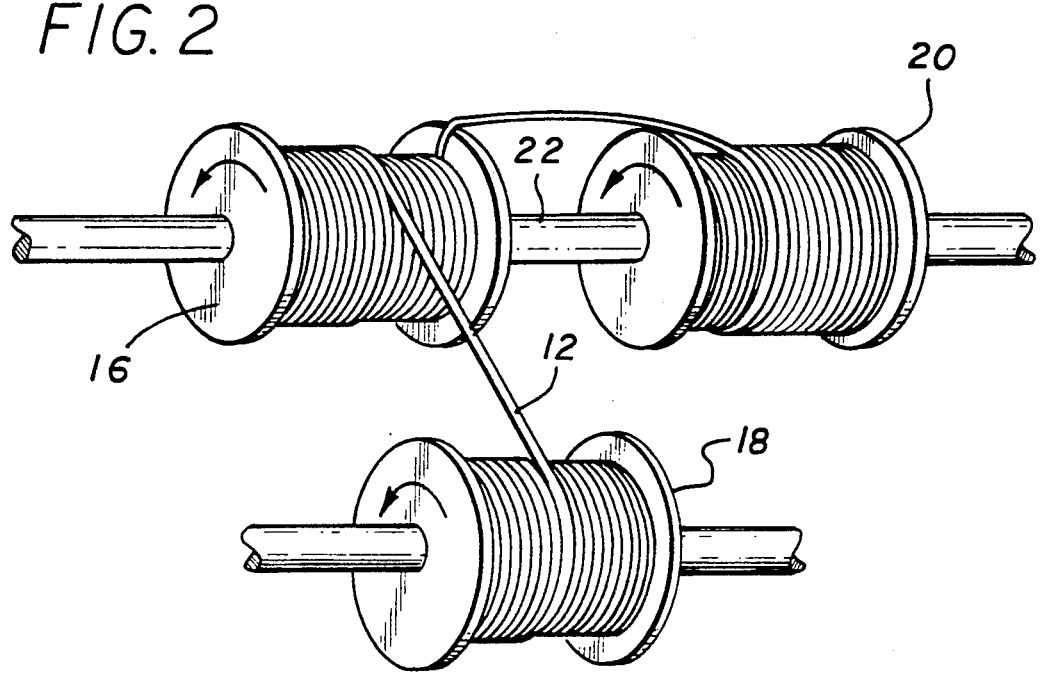
FIG. 2 is a perspective view of an arrangement for winding a symmetrical sensor coil.

As discussed above, the creation of a winding pattern that is symmetrical about the mid-point of the fiber 12 is quite beneficial in terms of reducing certain bias effects that can be traced to the gyro's operating environment. An important symmetrical pattern utilizes quadrupole-wound symmetry. While the method of the present invention is not limited to quadrupole, or even symmetrical, winding patterns, the wound coil provides the starting point for the method. Accordingly, symmetrical winding patterns, which minimize the Shupe effect, provide an advantageous starting point for the practice of the coil trimming method of the invention. The quadrupole pattern is attained by dividing the continuous fiber 12 onto two source spools of equal fiber lengths, and winding onto a reel, alternating source spools for each consecutive dual layer. A dual layer consists of two layers with their wrap starting and stopping at the same flange (in the event a flanged mandrel is employed). The first layer is wound singly and forms the inner layer of the coil. Thereafter, layers are wound in alternating pairs from the two supply reels. Such an arrangement is shown in FIG. 2. As is seen, an optical fiber 12 is wound onto a sensor spool 16 from supply spool 18 and 20. The fiber 12 is wound from a single supply spool at a time and the other supply spool is rotated with the take-up or sensor spool to prevent the unwinding of previously formed layers. Thus, in FIG. 2 a layer of fiber 12 is wound onto the sensor spool 16 from the supply spool 18. The supply spool 20 is mounted for rotation with the sensor spool 16 by a common shaft 22. The supply spools 18 and 20 are alternately mounted to the shaft 22 to rotate with the sensor spool 16 as the fiber 12 is fed onto the sensor spool 16 from the remaining supply or auxiliary spool.

The quadrupole winding pattern preserves symmetry about the center of the fiber and, as a result, decreases those phase errors that are otherwise induced by changing thermal conditions, The influence of changing thermal gradients upon phase errors, known as the Shupe Effect, is discussed, for example by N.J. Frigo in "Compensation of Linear Sources of Non-reciprocity in Signal Interferometers", SPIE Proceedings, Fiber Optic and Laser Sensors, Vol. 412 (Arlington Va., Apr. 5 through 7, 1983) at pages 268–271.

Figure 3A:
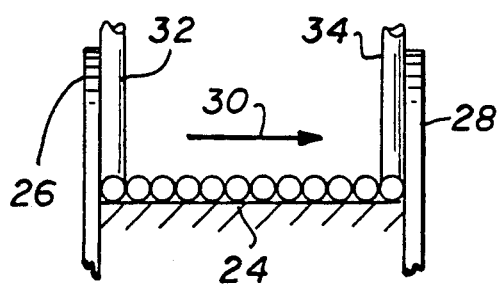
FIGS. 3A through 3C are a series of views, in cross-section, of a sensor coil for illustrating the development of a quadrupole winding pattern.
Figure 3B:
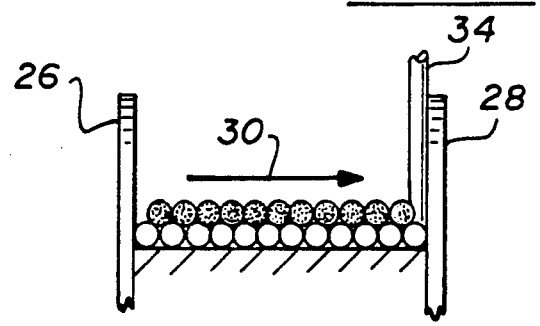
Figure 3C:
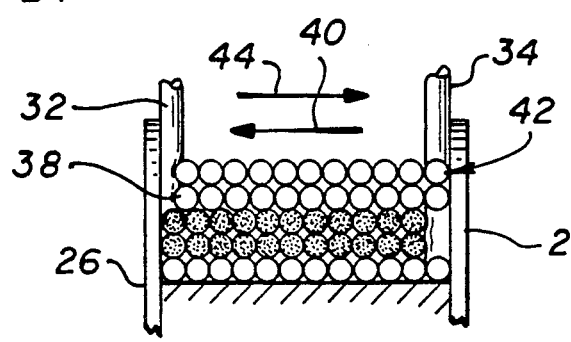

Referring to the apparatus of FIG. 2 in conjunction with FIGS. 3A through 3C, the quadrupole winding process is begun by positioning the midpoint of the fiber 12 onto the mandrel 24 of the sensor spool 16 adjacent one of its opposed flanges 26 and 28. This defines the midpoint of the winding pattern.

Winding from the first of the supply spools along the direction 30, a first layer is formed atop the core 24 as shown in FIG. 3A. (Each cross-section of the fiber 12 indicates a turn of the coil winding. Turns wound from the two supply spools are distinguished by the presence and absence of interior stippling.)

After the initial layer is wound onto the sensor spool 16 the two supply spool leads 32, 34 are then positioned adjacent the flanges 26 and 28 as shown. The formation of this initial layer is considered part of the initial setup and is not performed again.

The relative positions of the supply spools (according to the arrangement of FIG. 2) are then rotated so that the layer formed in FIG. 3A is maintained and a second layer formed from the second supply spool by winding away from the "home" (left) flange 26 of the second supply to the flange 28 as illustrated in FIG. 3B. (The lead 34, at the same time, "pops up" as shown.) This is followed by a reversal in the direction of winding of the fiber 12 from the second supply spool to create a third (stippled) layer as shown in FIG. 3C.

The lead 34, as shown in FIGS. 3B and 3C, is upwardly directed to avoid "burial" under the stippled layers of the other supply and to permit the formation of a pair of (non-stippled) layers thereover from the first supply. The first of such layers, indicated at 38, is formed by winding from lead 34 in the direction 40 and the second, overlying layer 42 is formed by winding in the reverse direction 44. As noted, the lead 32 projects upwardly at the edges of these layers adjacent the flange 26 to permit the formation of a pair of layers from the second supply. The foregoing steps for forming pairs of layers are repeated, the supplies alternating every two layers as indicated by the contrasting turn markings of FIG. 3C, and the process continued until the required number of quadrupole layers is wound from the supply spools to the sensor spool 16.

The resulting coil has the property that lengths of fiber 12 that are equidistant form the center of the mandrel are in close proximity and therefore affected to substantially the same degree by a distribution of temperatures or temperature field that is symmetrical with respect to the mandrel-and-coil geometry. In such a case, temperature gradients will be relatively symmetrical about the midpoint of the wound coil. It follows from this that, in such a case, phase errors due to the Shupe effect are likewise symmetrical about the midpoint of the fiber and may, therefore, be substantially cancelled.

Figure 4A:
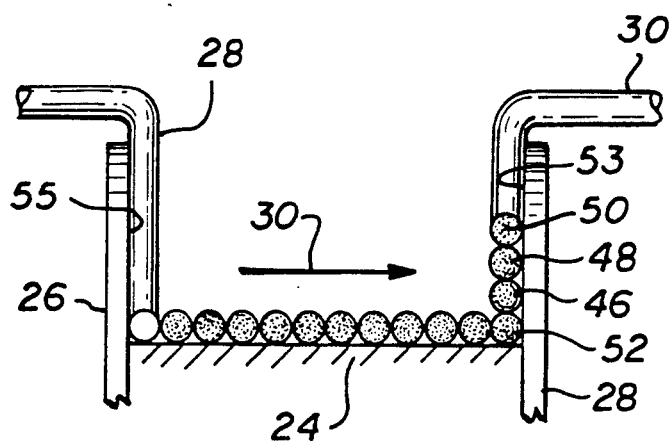
FIGS. 4A through 4C are a series of views, in cross-section, of a sensor coil for illustrating the development of an alternative quadrupole winding pattern.
Figure 4B:
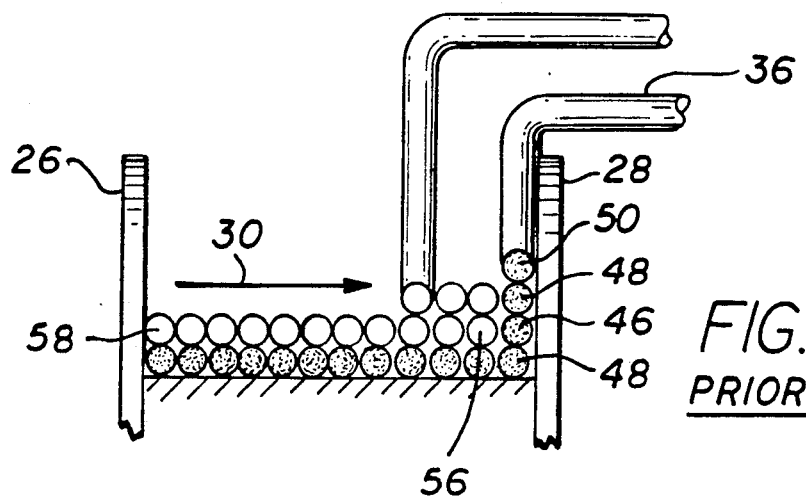
Figure 4C:
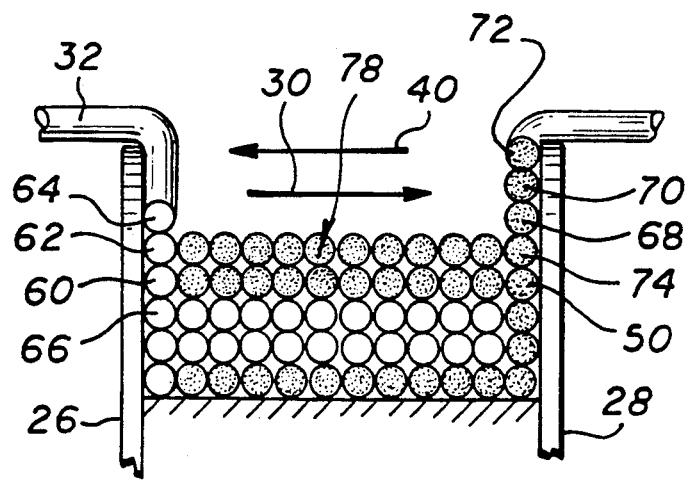

An alternative geometry and process for winding a quadrupole fiber optic sensing coil is described in U.S. Pat. No. 4,856,900 of Mirko Ivancevic entitled "Quadrupole-wound Fiber Optic Sensing Coil and Method of Manufacture Thereof." Such process is illustrated in FIGS. 4A through 4C. As before, the midpoint of the fiber 12, which is precision-wound upon a pair of supply spools, is positioned upon the central core of the sensor spool 16 adjacent the inner surface of the flange 26. Also, as before, a single inner layer is formed adjacent the mandrel 24 by winding fiber 12 from a supply spool (in the direction 30) from the flange 26 to the flange 28.

Three turns 46, 48 and 50 are wound concentric with the "end" turn 52 (turn adjacent the flange 28) of the first layer. The turns 46, 48 and 50 are held to the flange 28 by means of an appropriate adhesive coating 53 at the interior of the flange 28.

Thereafter, as shown in FIG. 4B, a layer is wound from the other supply spool in the same direction 30. However, the end turn 56 of the layer 58 does not exert pressure and stress along the length of the lead 36 of the previously-wound layer. Rather, this end turn abuts against the turn 46 which, with the concentric turns 48 and 50, forms a fiber "barrier" adjacent the flange 28.

Figure 5:
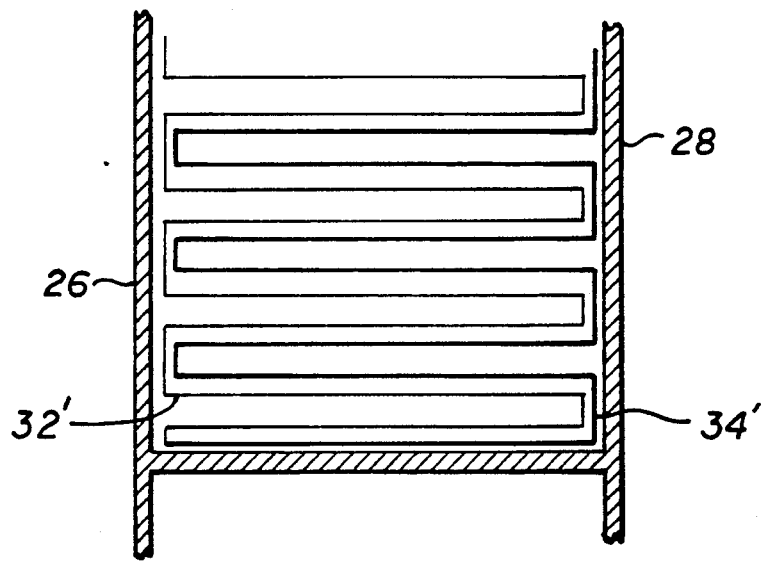
FIG. 5 is a schematic view of the winding pattern for forming a quadrupole-wound sensor coil in accordance with the alternative embodiment of the preceding figure.

The second quadrupole layer of fiber from the second supply spool is then wound in the opposite direction 40 toward the flange 26. As shown in FIG. 4C, three turns 60, 62 and 64 are wound from the lead 32 concentric with the end turn 66 of the just-formed quadrupole-wound layer pair. The stippled layer pair atop that layer is wound from the first supply as before beginning with the topmost turn 50 that was previously wound concentric with the end turn 52 of the initial layer and, upon completion of the winding of a layer pair, concentric turns 68, 70 and 72 are wound concentric with the end turn 74 of the layer. The overall winding pattern of a quadrupole wound coil formed in accordance with this invention is shown schematically in FIG. 5. The paths of travel of the leads 32 and 34 associated with the supplies 18 and 20 are indicated by the respective primed notations.

The alternative quadrupole winding configuration offers a number of advantages including the elimination of microbends generated about the pop-up segments, consistency of fiber turn radius, and the undesired generation of phase shifts caused by the pinching of leads. Both of the above-described coil winding processes can be readily extended to like symmetrical winding methods including, for example, an octopole winding configuration in which the winding pattern is repeated every eight (8) layers.

The inventors have found that, while symmetrical winding patterns tend to reduce the Shupe effect bias error resulting from temperature changes, unacceptably-large errors may still be observed. They have further found that such residual bias errors may be minimized by carefully adjusting the effective mid-point of the sensor coil. This is accomplished by differentially adjusting the two ends of the wound coil to "rebalance" the coil about a new midpoint.

Figure 6:
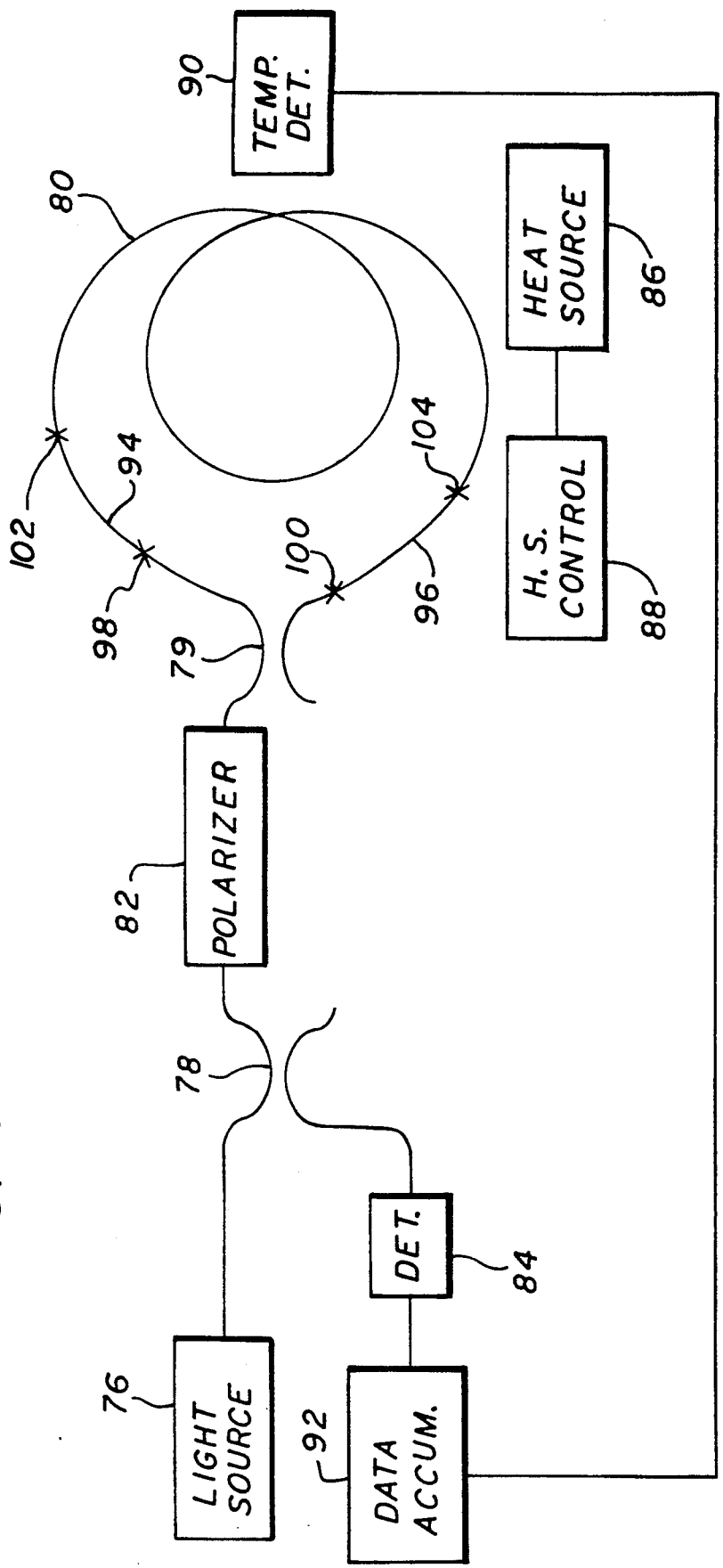
FIG. 6 is a schematic diagram of test apparatus for practicing the method of the invention.

FIG. 6 is a schematic diagram of test apparatus for optimizing a wound sensor coil in terms of such "residual" (although not necessarily minor) bias error sensitivity. As can be seen, the test apparatus includes a complete interferometer as described in the background portion of the patent application. This includes a light source 76, the output of which is directed to a fiber optic directional coupler 78 that is engaged to a polarizer 82 whose output is directed to a second fiber optic directional coupler 79 engaged to a sensor coil 80 whose performance is to be evaluated. The output of the interferometer is coupled through the coupler 79 to the polarizer 82 and the coupler 78 to a detector 84. The operation and arrangement of such apparatus is well known and described in the background of the application.

Means are provided for generating and measuring data indicative of the Shupe (temperature rate) effect bias error of the sensor coil 80. Such means includes a heat source 86 whose output is regulated by a source controller 88. A temperature detector 90 is located in the region of the sensor coil 80 for providing an indication of the temperature, and rate of change thereof, in the region of the coil 80. The temperature detector 90 is coupled to a test data accumulator 92 that synchronously receives the (temperature) readings of the temperature detector 90 and the interferometer output from the detector 84.

The sensor coil 80 is optimized in terms of residual Shupe bias error susceptibility by adjusting the midpoint thereof as described above. Fiber segments 94 and 96 are provided at (alternatively) either end of the wound coil 80 for adjusting the location of the midpoint of the sensor coil winding. Each of such segments 94, 96 is joined to a termination, or pigtail, of the coupler 79 at a first splice 98, 100 respectively while the opposed ends are engaged to by a second splice 102, 104 to, and operate as portions of, the wound coil 80. In actual practice, only a single segment 94 or 96 will be employed at a time to create a differential between the lengths of the initially-equal "halves" of the fiber comprising the coil 80. It is this "imbalance" that effectively moves or displaces the center of the wound fiber coil (regardless of winding geometry).

The inventors have found that, once a sensor coil 80 has been completed, it may still be optimized by a "rebalancing" process in which the midpoint of the coil's wound geometry is shifted with respect to the opposed ends of the wound coil 80. That is, they have found that, by taking an existing sensor coil and "trimming" (which may actually consist of supplementing) one end thereof with respect to the other, the sensitivity of the coil with respect to the Shupe temperature effect will be altered. In practice, an iterative process is employed in which a fiber segment 94 or 96 is fixed between first and second splices 98, 102 or 100, 104 respectively and thereby effectively added to one end of the coil 80 creating a differential between the lengths of the optical fiber of the coil from the original mid-point of the winding geometry. (This may be viewed in the alternative as shifting the mid-point of the winding geometry.) The performance of the interferometer test apparatus is then measured as the temperature of the sensor coil is cycled and the Shupe effect coefficient determined. Thereafter, the length of the fiber segment 94 or 96 is altered and re-spliced to the test apparatus of FIG. 6. Again, interferometer performance is determined and Shupe effect sensitivity determined as the temperature of the sensor coil is once again cycled.

In the event that the length of the segment 94 or 96, joined to one end of the coil 80, is successively shortened while improving, although not sufficiently good, bias error performance is observed, that end of the coil 80 is then directly spliced to the coupler 78 and the other segment 94 or 96 is then successively spliced onto the other end of the coil 80 in gradually lengthened segments. Through observation of the behavior of the coil during successive temperature cyclings characterized by distinct differentials between the coil ends, the inventors have found that the above-described trimming process will yield an "adjusted" coil of greatly enhanced Shupe effect performance.

As an alternative to the addition of a fiber segment 94 or 96 to create a differential between the lengths of optical fiber from the original mid-point of the wound coil, such a differential may, of course, also be obtained through a trial and error process as described above that involves clipping one or both ends of the original wound coil until a differential in lengths is obtained that produces an acceptably-low level of sensitivity. While such alternative method shortens the sensor coil and thereby reduces accuracy, such a reduction will generally be negligible due to the relatively small proportion of the fiber of the original coil that must be trimmed. The amount of fiber trimmed will be further reduced through the use of symmetrical winding patterns, such as quadrupole winding, that reduce Shupe error sensitivity.

By clipping, rather than adding segments, the alternative method eliminates the need for introducing one or two additional fiber splice(s). Since a splice can introduce polarization reciprocity error, each splice "removed" from the resultant tuned sensor coil will result in improved performance. For this same reason, even when one adds a segment 94 or 96 to determine the optimum differential or deviation of the coil mid-point, a clipping process may then be employed after tuning. This may be accomplished by reducing the length of the half of the wound coil to which no segment was added by the length of the segment 94 or 96 found to provide optimum results and detaching the segment from the other end of the adjusted coil. In this way, the optimum fiber length differential is obtained without the introduction of additional splices. Further, by determining the optimum differential before clipping from an end of the wound coil, the degree of accuracy that will be lost by the required shortening of the length of the coil is known prior to any coil alteration. Thus, the designer will be left with a choice while the coil 80 remains intact.

Figure 7:
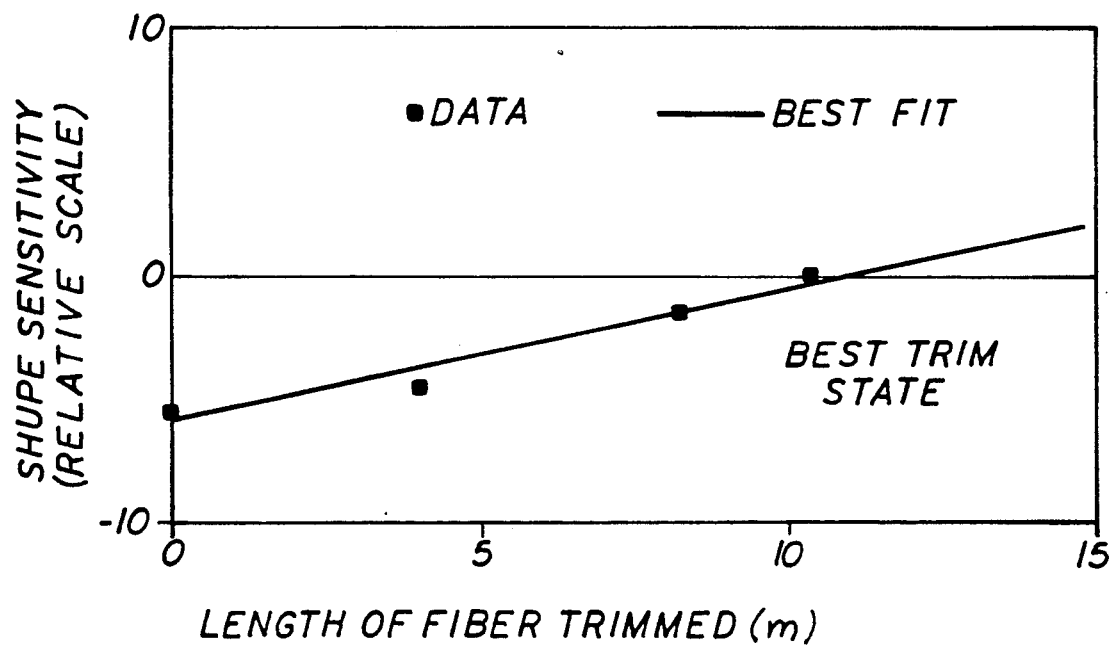
FIG. 7 is a graph of data for illustrating the effect of coil trimming upon the Shupe coefficient.

FIG. 7 is a graph of data derived in accordance with the above-described coil trimming method of the invention. The data points plotted correlate normalized Shupe coefficient values (ordinate) with length of fiber trimmed (meters). Data was obtained through successive clippings from one end of a sensor coil comprising one kilometer of 165 micron PM optical fiber. Measurements of Shupe error sensitivity were made at room temperature (22.5 degrees Centigrade) and temperature ramps of 0.5 and 1.0 degrees Centigrade per minute were employed.

The data, reflecting the as-wound sensitivity and three (3) different coil trims taken from one end of the fiber, indicate a substantially-linear relationship between length of fiber trimmed and normalized Shupe sensitivity. The normalized Shupe sensitivity was reduced to a negligible amount by the trimming of ten (10) meters from the coil. This represents only a one per cent reduction in total coil length. Accordingly, measurement accuracy is maintained while the Shupe sensitivity is greatly reduced.

Thus it is seen that the present invention provides a powerful method for tuning a fiber optic sensor coil to reduce residual Shupe error sensitivity. By utilizing the teachings of the invention, one can reduce the residual error in many cases to a negligible amount. By employing the coil trimming method in conjunction with a symmetrical coil, such as a quadrupole-wound coil, one can achieve very precise tuning.

While this invention has been described with reference to its presently-preferred embodiment, it is not limited thereto. Rather, this invention is limited only insofar as it is defined by the following set of patent claims and includes within its scope all equivalents thereof.

What is claimed is:

1. A method for tuning a sensor coil of the type that includes an optical fiber of known length arranged into a winding pattern, said method comprising the steps of:
    a) adjusting one end of said wound coil by a known amount with respect to the other end so that the length of fiber between the midpoint of said winding pattern and one end differs from that between said center and the other end by said amount; then
    b) attaching said adjusted coil to test apparatus arranged so that the performance of said coil in an interferometer may be ascertained; then
    c) observing the performance of said adjusted coil in said apparatus; then
    d) repeating steps a through c until an acceptable level of bias error is observed; and then
    e) removing said adjusted coil from said test apparatus.

2. A method as defined in claim 1 wherein the step of observing the performance of said adjusted coil further includes the steps of:
    a) varying the temperature of said coil at a predetermined rate; and
    b) measuring the bias error in the output of said test apparatus; and then
    c) determining the Shupe effect coefficient of said adjusted coil.

3. A method as defined in claim 2 wherein the step of adjusting said coil additionally comprises the step of splicing a first end of a fiber segment of predetermined length onto one end of said wound coil.

4. A method as defined in claim 3 wherein the step of attaching said adjusted coil to said test apparatus further comprises the steps of:
    a) splicing the other end of said fiber segment to said test apparatus; and
    b) splicing the other end of said wound coil to said test apparatus.

5. A method as defined in claim 4 wherein said test apparatus includes means for launching a counterpropagating beam pair into said adjusted coil and measuring the resultant phase shift.

6. A method as defined in claim 5 wherein the step of repeating further includes the steps of:
    a) splicing said fiber segment of predetermined length to said end of said wound coil; then
    b) observing the performance of said test apparatus; then
    c) removing said fiber segment; and then
    d) repeating steps a through c with fiber segments of differing predetermined lengths.

7. A method as defined in claim 6 including the additional steps of:
    a) splicing said end of said fiber coil directly to said test apparatus; then
    b) splicing a second fiber segment of predetermined length to the other end of said wound coil; then
    c) observing the performance of said test apparatus; then
    d) removing said second fiber segment; and then
    e) repeating steps a through d with second fiber segments of differing predetermined lengths.

8. A method as defined in claim 7 wherein said wound coil is arranged in an asymmetrical winding pattern.

9. A method as defined in claim 7 wherein said wound coil is arranged in a symmetrical winding pattern.

10. A method as defined in claim 9 wherein said symmetrical winding pattern is a quadrupole pattern.

11. A method as defined in claim 2 wherein the step of adjusting additionally includes the step of clipping a segment of fiber of predetermined length from one end of said wound coil.

12. A method as defined in claim 11 wherein the step of repeating further includes the steps of:
    a) clipping a segment of fiber of predetermined length from one end of said wound coil; then
    b) observing the performance of said test apparatus; and then
    c) repeating steps a and b while clipping fiber segments of different predetermined lengths.

13. A method as defined in claim 12 including the additional steps of:
    a) splicing said end of said fiber coil directly to said test apparatus; then
    b) clipping a predetermined length of fiber from the other end of said wound coil; then
    c) observing the performance of said test apparatus; and then
    d) repeating steps a through c while clipping segments of different predetermined lengths.

14. A method as defined in claim 13 wherein said wound coil is arranged in an asymmetrical winding pattern.

15. A method as defined in claim 13 wherein said wound coil is arranged in a symmetrical winding pattern.

16. A method as defined in claim 15 wherein said symmetrical winding pattern is a quadrupole pattern.

* * * * *